F. G. LIADY.
WIRE WHEEL CARRIER FOR AUTOMOBILES.
APPLICATION FILED MAR. 8, 1917.
1,231,393.
Patented June 26, 1917.
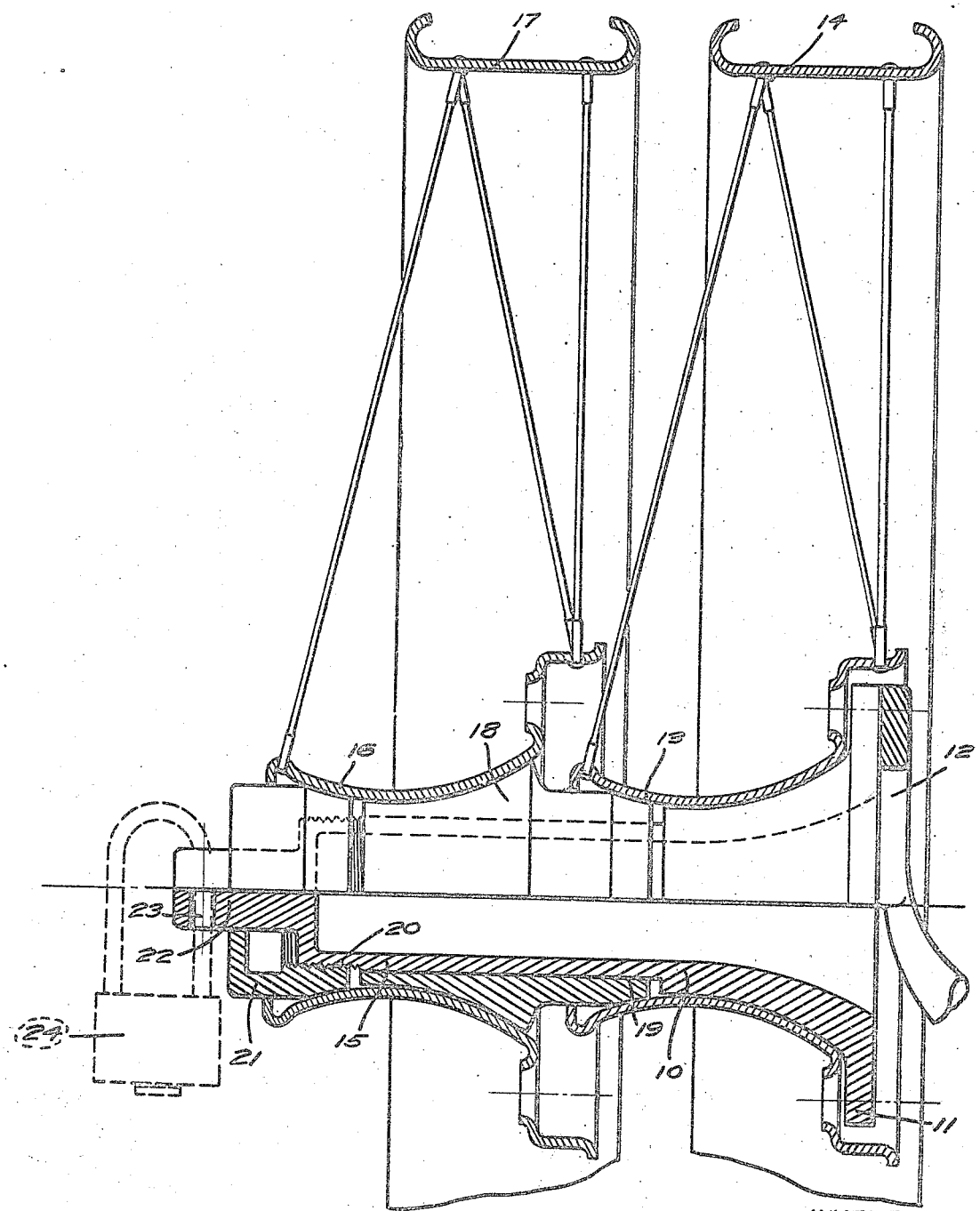
INVENTOR
FRED GARDNER LIADY

UNITED STATES PATENT OFFICE.

FRED GARDNER LIADY, OF FULLERTON, CALIFORNIA.

WIRE-WHEEL CARRIER FOR AUTOMOBILES.

1,231,393.  Specification of Letters Patent.  Patented June 26, 1917.

Application filed March 8, 1917. Serial No. 153,324.

*To all whom it may concern:*

Be it known that I, FRED GARDNER LIADY, a citizen of the United States, residing at Fullerton, in the county of Orange and State of California, have invented new and useful Improvements in Wire-Wheel Carriers for Automobiles, of which the following is a specification.

This invention relates to a wheel carrier and particularly pertains to a carrier for wire wheels adapted to be mounted upon an automobile.

It is the principal object of this invention to provide a wire wheel carrier which will permit a plurality of wire wheels to be mounted thereon and held in a rigid manner until their use is desired.

Another object is to provide a carrier upon which a single wheel may be mounted rigidly by engagement with the hub, and upon which two wheels may be mounted rigidly, when desired, the wheels being spaced apart and independent of each other.

Another object of this invention is to provide a carrier which is simple in its construction and which acts to wedge the hubs in place upon the carrier members in a manner to prevent rattle or distortion of the hub members.

It is a further object of this invention to provide adjustable means whereby the wheels may be locked upon the carrier and thereafter secured in a positive manner by other locking means.

Other objects will appear hereinafter.

The invention is illustrated, by way of example, in the accompanying drawing.

The figure illustrates a view in section and elevation of the wheel carrier as providing support for a pair of wire wheels.

Referring more particularly to the drawing, 10 indicates a tubular mandrel which is formed at one end with an enlarged flange 11 to which is suitably secured a mounting bracket 12. This bracket in turn is fixed in a desired position upon the body of an automobile and, as is now the custom, is preferably mounted at the rear of the vehicle. The portion of the mandrel adjacent the flange 11 is substantially frusto-conical and is adapted to conform to the contour of the wheel hub, as is clearly shown in the drawing. This frusto-conical section extends partially through hub 13 of the wheel 14 and terminates with a shoulder from which a straight cylindrical portion 15 of the mandrel extends. This part of the mandrel passes substantially through hub 16 of the wheel 17 and provides a support for a removable sleeve 18. Sleeve 18 possesses the same frusto-conical portion as described for the mandrel and is provided to wedge within one side of the hub 16. The rear end of this sleeve is formed with a reduced taper portion 19 which wedges into the opened outer end of the hub 13. The cylindrical portion 15 of the mandrel is provided with threads 20 which receive a wedge nut 21. This nut corresponds in shape to the reduced portion 19 of the sleeve 18 as it wedges within the outer open end of hub 16. The mandrel is formed with another reduced section 22 which passes through the wedge nut 21 and has a transversely disposed passage-way 23 adapted to receive padlock 24. This lock will prevent the wheels from being removed.

In operation, the wheel 14 is first placed over the mandrel with its inner face against the flange 11. The main portion of the hub will then surround and be seated upon the frusto-conical portion of the mandrel, after which sleeve 18 is placed in position upon the reduced section 15 of the mandrel. The wheel 17 is then mounted upon the sleeve with its inner face circumscribing the end of the hub 13. Lock nut 21 is then placed in position and drawn tight. This will wedge the hub 16 upon the sleeve 18 and will in turn wedge the reduced portion 19 of the sleeve within the hub 13, thus securing the two wheels in a rigid detachable condition. The padlock 24 may then be placed through the opening 23 and the wheels will then be secured against unauthorized removal.

When the wheels are to be removed, the padlock is withdrawn from the opening 23 and the wheel 17 is turned. This will loosen the nut 21 and permit its ready removal. After the nut 21 has been removed, the wheel 17, the sleeve 18 and the wheel 14 may be successively withdrawn from the mandrel.

Attention is called to the fact that a single wheel may be rigidly mounted by engagement with the hub and that two wheels may be rigidly mounted, the wheels being spaced apart and independent of each other.

It will thus be seen that the wheel carrier here provided is simple in its construction, will hold a plurality of wheels and insure that they are held in a fixed manner and may be locked against removal.

While I have shown the preferred construction of my wheel carrier as now known to me, it will be understood that various changes in the construction, combination and arrangement of parts may be made by those skilled in the art without departing from the spirit of my invention.

I claim:

1. A mounting bracket adapted to be secured to an automobile, a flange secured to the bracket and adapted to fit within the sand rim of a wheel hub, a frusto-conical portion extending from the flange and adapted to fit in the inner end of the wheel hub, a straight portion extending from the frusto-conical portion and having a screw threaded end, a sleeve fitting upon the straight portion and having a tapered end adapted to fit in the outer end of the wheel hub, and a nut screw seated upon the threads to tighten the sleeve on the hub and hold the wheel rigid.

2. A mounting bracket adapted to be secured to an automobile, a flange secured to the bracket and adapted to fit within the sand rim of a wheel hub, a frusto-conical portion extending from the flange and adapted to fit in the inner end of the wheel hub, a straight portion extending from the frusto-conical portion and having a screw threaded end, a sleeve fitting upon the straight portion and having a tapered end adapted to fit in the outer end of the wheel hub, and a nut screw seated upon the threads to tighten the sleeve on the hub and hold the wheel rigid; there being a second frusto-conical portion upon the sleeve adapted to fit in the inner end of a wheel hub and there being a second tapered portion upon the nut to fit in the outer end of the second hub, so as to hold the two wheels spaced apart, rigid, and independent.

In testimony whereof I have signed my name to this specification.

FRED GARDNER LIADY.